United States Patent [19]

West, II et al.

[11] Patent Number: 5,681,375

[45] Date of Patent: Oct. 28, 1997

[54] BOILER FLUE GAS CONDITIONING SYSTEM USING DILUTE SULFURIC ACID INJECTION

[75] Inventors: Judson H. West, II; Robert A. Wright, both of Indianapolis, Ind.

[73] Assignee: Wilhelm Environmental Technologies, Inc., Indianapolis, Ind.

[21] Appl. No.: 680,996

[22] Filed: Jul. 16, 1996

[51] Int. Cl.⁶ .................................................. B03C 3/013
[52] U.S. Cl. .......................... 96/19; 95/3; 95/72; 96/53; 96/74; 110/345; 422/173
[58] Field of Search ............................... 96/52, 53, 74, 96/61, 69, 44, 45, 94, 18, 19; 423/243.01; 95/64–66, 71, 72, 78, 59, 2, 3, 6, 7; 110/345; 261/76; 422/173–176

[56] References Cited

U.S. PATENT DOCUMENTS

| | | | |
|---|---|---|---|
| 3,665,676 | 5/1972 | McKewen | 96/52 X |
| 3,689,213 | 9/1972 | Guerrieri | 95/60 |
| 3,722,178 | 3/1973 | Aaland et al. | 95/4 |
| 4,070,424 | 1/1978 | Olson et al. | 96/52 X |
| 4,208,192 | 6/1980 | Quigley et al. | 96/53 X |
| 4,770,674 | 9/1988 | Tellini et al. | 95/4 |
| 4,874,400 | 10/1989 | Jury | 95/65 X |
| 5,032,154 | 7/1991 | Wright | 96/19 X |
| 5,261,931 | 11/1993 | Wright | 95/3 |
| 5,449,390 | 9/1995 | Duncan et al. | 95/72 X |

*Primary Examiner*—Richard L. Chiesa
*Attorney, Agent, or Firm*—Ice Miller Donadio & Ryan

[57] ABSTRACT

Disclosed is an improved system for treating boiler flue gas to improve the removal of particulate matter contained therein by electrostatic precipitation. The improved system includes a source of liquid sulfuric acid, a source of water, a mixer for mixing the sulfuric acid and the water to form a dilute sulfuric acid, a first pipe for conveying the sulfuric acid from the acid source to the mixer, a first meter for controlling the amount of liquid sulfuric acid conveyed to the mixer through the first pipe, a second pipe for conveying the water from the water source to the mixer, a second meter for controlling the amount of water conveyed to the mixer through the second pipe, an injector for injecting the mixture of sulfuric acid and water from the mixer into the flue gas conduit before the particulate removing device in droplets small enough that the heat of the heated flue gas will cause the droplets to evaporate, and a third pipe for conveying the mixture of sulfuric acid and water from the mixer to the injector. The disclosed invention allows for the conditioning of flue gases by a system which is simple and inexpensive to install, maintain and operate, which requires no additional heat to vaporize the dilute sulfuric acid prior to injection, and which requires very little power, especially when compared to a conventional $SO_3$ system.

15 Claims, 1 Drawing Sheet

BOILER FLUE GAS CONDITIONING SYSTEM USING DILUTE SULFURIC ACID INJECTION

FIELD OF THE INVENTION

This invention relates to a system for treating boiler flue gas to improve the removal of particulate matter contained therein by electrostatic means and, more particularly, relates to a method for conditioning flue gases through the introduction therein of dilute sulfuric acid to provide conditioning agent to the flue gas particulate matter prior to its passage through an electrostatic precipitator.

BACKGROUND OF THE INVENTION

Electrical utilities must burn increasing quantifies of fossil fuels to satisfy the ever-increasing demand for electric power. At the same time, electric utilities face increasing clean-air standards that are imposed upon their operation. In trying to satisfy the divergent demands of increasing power and decreased air pollution, electrical utilities have turned to using low-sulfur coals to fire their boilers and generate the steam needed for electrical power generation.

Electrical utilities have long relied upon electrostatic means such as electrostatic precipitators to remove particulate matter from boiler flue gas. The efficiency of operation of the electrostatic precipitators in the removal of particulate matter from boiler flue gas is dependent, in part, upon the electrical resistivity of the entrained particulate matter in boiler flue gas. It has been found that where a boiler is fired with low sulfur content coal, the entrained particulate matter in the boiler flue gas has a high resistivity, for example, $10^{13}$ ohm-cm resistance and more. It has also been determined that the most efficient removal of particulate matter by electrostatic precipitation occurs when its resistivity is on the order of about $10^8$ ohm-cm and that when the resistivity of the particulate matter is higher, for example, on the order of $10^{13}$ ohm-cm, the efficiency of electrostatic precipitation is substantially reduced. Thus, reduced efficiency in the operation of electrostatic precipitators with the flue gas from low-sulfur coals has been attributed to the higher resistivity of such flue gas particles. Any reduction of the ability of an electrostatic precipitator to remove particles from the flue gas can offset, of course, the reduced or potentially reduced air pollution sought through the use of the more expensive low-sulfur coals.

One solution to this problem has been to condition the boiler flue gas prior to its entrance into the electrostatic precipitator by the use of a conditioning agent to reduce the resistivity of the entrained particles within the boiler flue gas. Among the various chemicals which have been used as conditioning agents for boiler flue gas are water, anhydrous ammonia and various ammonia-bearing solutions, sulfuric acid, sulfur trioxide and phosphoric acid. U.S. Pat. No. 3,689,213 discloses a process for treating flue gas in which gaseous sulfur trioxide is generated in the immediate vicinity of the point of use as required by the quantity of fossil fuel being burned per unit time and is then introduced into the flue gas at a predetermined rate to facilitate fly ash removal by an electrostatic precipitator. In the system of U.S. Pat. No. 3,689,213, air and gaseous sulfur dioxide are heated in a heat exchanger to a temperature required for oxidation of sulfur dioxide to sulfur trioxide. The air and sulfur dioxide are passed through a catalytic converter for conversion of the sulfur dioxide to sulfur trioxide prior to its injection into the boiler flue gas.

U.S. Pat. No. 3,722,178 discloses a system for the production of sulfur trioxide for flue gas conditioning including means to deliver a source of sulfur such as sulfuric acid to a vaporizer in proportion to the amount of flue gas from the boiler measured in terms of the electrical output generated at a particular time. As the production of flue gas changes in the boiler system, the proper ratio of acid to flue gas is automatically maintained by a control responsive to a signal coming from a boiler capacity index gauge to control the volume of sulfur trioxide being produced. The vaporizer is provided with a mixture of fresh air and a combustion gas from a natural gas or oil, to convert the sulfuric acid to sulfur trioxide. The amount of combustion gas directed into the combustion chamber is automatically controlled by the exit temperature of the sulfur trioxide as indicated by temperature controllers mounted at the top and bottom of the vaporizer in the path of the output gas. The temperature controllers maintain the temperature of the vaporizer in the range for efficient production of sulfur trioxide. An additional temperature controller at the exit of the vaporizer turns off the burner when the temperature at the exit exceeds 1200 degree(s) F. (649 degree(s) C.).

More recent developments have centered on sulfur trioxide as a flue gas-conditioning material. Such flue gas-conditioning systems have included systems which store liquefied sulfur which is fed to a sulfur burner in which the sulfur is converted by combustion predominantly to sulfur dioxide. The systems then pass the sulfur dioxide to a catalytic converter which employs a vanadium pentoxide catalyst to convert the sulfur dioxide into sulfur trioxide. The sulfur trioxide created by such systems is piped to a nozzle system for injection into ducts carrying the boiler flue gas and its entrained particulate material to reduce the electrical resistivity of the flue gas particulate matter for removal by an electrostatic precipitator.

U.S. Pat. No. 4,770,674 discloses a system for conditioning flue gas for an electrostatic precipitator, including equipment for converting sulfur into sulfur trioxide. The disclosed systems of U.S. Pat. No. 4,770,674 include a sulfur burner to produce oxidized sulfur, a catalytic converter to convert the oxidized sulfur to sulfur trioxide, and means to control sulfur and air inputs to the sulfur burner. Various inputs to the control means are disclosed, including the outlet temperature of the catalytic converter and such operating parameters of the exhaust stage of the system as the output temperature of the exhaust gas from the precipitator, the flow rate of the exhaust gas, the power delivered to or the speed of, an induced draft fan, if any, the opacity of the exhaust gas within the stack, and the power dissipated by the precipitator.

U.S. Pat. Nos. 5,032,154 and 5,261,931, which are owned by the assignee of this application, disclose flue gas conditioning systems which provide a controlled flow of sulfur trioxide into a boiler flue gas and its entrained particulate material ahead of an electrostatic precipitator. The systems monitor the opacity of the stack effluent and precipitator power and operate to maintain a flow of sulfur trioxide into the boiler flue gas to provide minimal opacity of the stack effluent. The systems operate at a sulfur trioxide flow rate corresponding to minimal opacity of the stack effluent and to eliminate corrections that may be due to transient operating conditions such as boiler upsets, precipitator rapping and the like. The systems include features providing improved conversion of sulfur dioxide into sulfur trioxide, integrated assemblies to provide a flow of sulfur dioxide and sulfur dioxide conversion units adapted to convert sulfur trioxide into sulfur dioxide at a plurality of remote sulfur trioxide injection sites.

The flue gas conditioning systems disclosed by the prior art suffer from the disadvantages that they tend to be mechanically complex, capitally intensive, and often expensive to operate and maintain. In particular, prior art systems are not well suited to power plants which have marginal precipitator operations and which may require some $SO_3$ conditioning only part of the time. For such plants, the prior art systems used to introduce sulfuric acid into the flue gas are not economically or technically desirable. Because such prior art systems contemplate the need for substantial and/or nearly continuous conditioning, substantial quantities of energy have to be transferred to the sulfuric acid to cause it to vaporize quickly as it is introduced into the flue gas so that it will effectively condition the flue gas for particulate removal. Sulfuric Acid is an aqueous solution. Consequently, sufficient heat energy to vaporize the water of the solution must be applied to effect vaporization thereby increasing the cost of operation. Further, the acid must be brought to disassociation temperature (600°–650° F.) very quickly to prevent metal corrosion.

Thus, it would be a substantial advance in the art to have a system for treating boiler flue gas in power plants with marginal precipitator operations that directly utilizes a dilute solution of sulfuric acid as a conditioning agent and that is both effective and economically acceptable. Accordingly, a system for treating boiler flue gas to improve the removal of particulate matter that utilizes a dilute sulfuric acid solution that is directly injected into the flue gas stream in an effective and economically feasible manner wold overcome the deficiencies in the prior art.

SUMMARY OF THE INVENTION

A system for treating boiler flue gas to improve the removal of particulate matter in accordance with this invention is used in a boiler system having a flue gas conduit for conveying heated flue gas from the fuel burning chamber of the boiler to a particulate removing device such as a precipitator. Typically in such a boiler system, an economizer is disposed in the flue gas conduit between the fuel burning chamber and the particulate removing device.

A source of sulfuric acid is provided. A source of water is provided. A means for mixing the sulfuric acid and the water is provided to dilute the sulfuric acid to a predetermined pH. A first pipe means for conveying the sulfuric acid from the source to the mixing means is provided. A first metering means is positioned in the first pipe means for controlling the amount of sulfuric acid that is conveyed to the mixing means through the first pipe means.

A second pipe means is provided for conveying the water from the source to the mixing means. A second metering means is positioned in the second pipe means for controlling the amount of water that is conveyed to the mixing means.

Injection means is provided for injecting the dilute sulfuric acid into the flue gas conduit at or downstream of the economizer outlet and upstream of the particulate removing device. A third pipe means is provided for conveying the dilute sulfuric acid from the mixing means to the injection means.

Typically, in the preferred embodiment, the injection means comprises a plurality of injection probes each of which incorporates an air atomization nozzle. Also, in the preferred embodiment, a source of pressurized air is provided. A fourth pipe means may also be provided for conveying the pressurized air from the source to said injection means. Alternatively, a source of steam may be provided, in which alternative said fourth pipe means is provided to convey the steam from said source to said injection means.

Control means are provided for controlling the initiation and termination of water flow and acid flow. The system may further comprise means for monitoring the pH of the dilute sulfuric acid downstream of the mixing means.

Thus, dilute sulfuric acid is injected directly into the flue gas stream. The water in the dilute sulfuric acid is vaporized into steam by the heat of the flue gas stream. As a result, sulfuric acid disassociates into $SO_3$ and water. The $SO_3$ thereby liberated reduces the resistivity of the flue gas particulate matter for removal by the precipitator thereby enhancing the ability of the precipitator to remove the particulates from the flue gas.

Thus, it is a primary object of the present invention to provide a system for treating boiler flue gas to improve the removal of particulate matter in boiler systems which have marginal precipitator operations by the direct introduction of dilute sulfuric acid in the flue gas stream. It is another object of the invention to provide a system for treating boiler flue gas to improve the removal of particulate matter in boiler systems where conventional $SO_3$ conditioning is too capital intensive for the amount of conditioning required. It is yet another object of the invention to provide a system which is ready to operate when needed and does not have special warm up or purge requirements.

Additional features and advantages of the invention will become apparent to those skilled in the art upon consideration of the following detailed description of a preferred embodiment of the invention, exemplifying the best mode of carrying out the invention as presently perceived. The detailed description particularly refers to the following figure in which:

DETAILED DESCRIPTION OF THE PREFERRED EMBODIMENT

Figure 1:
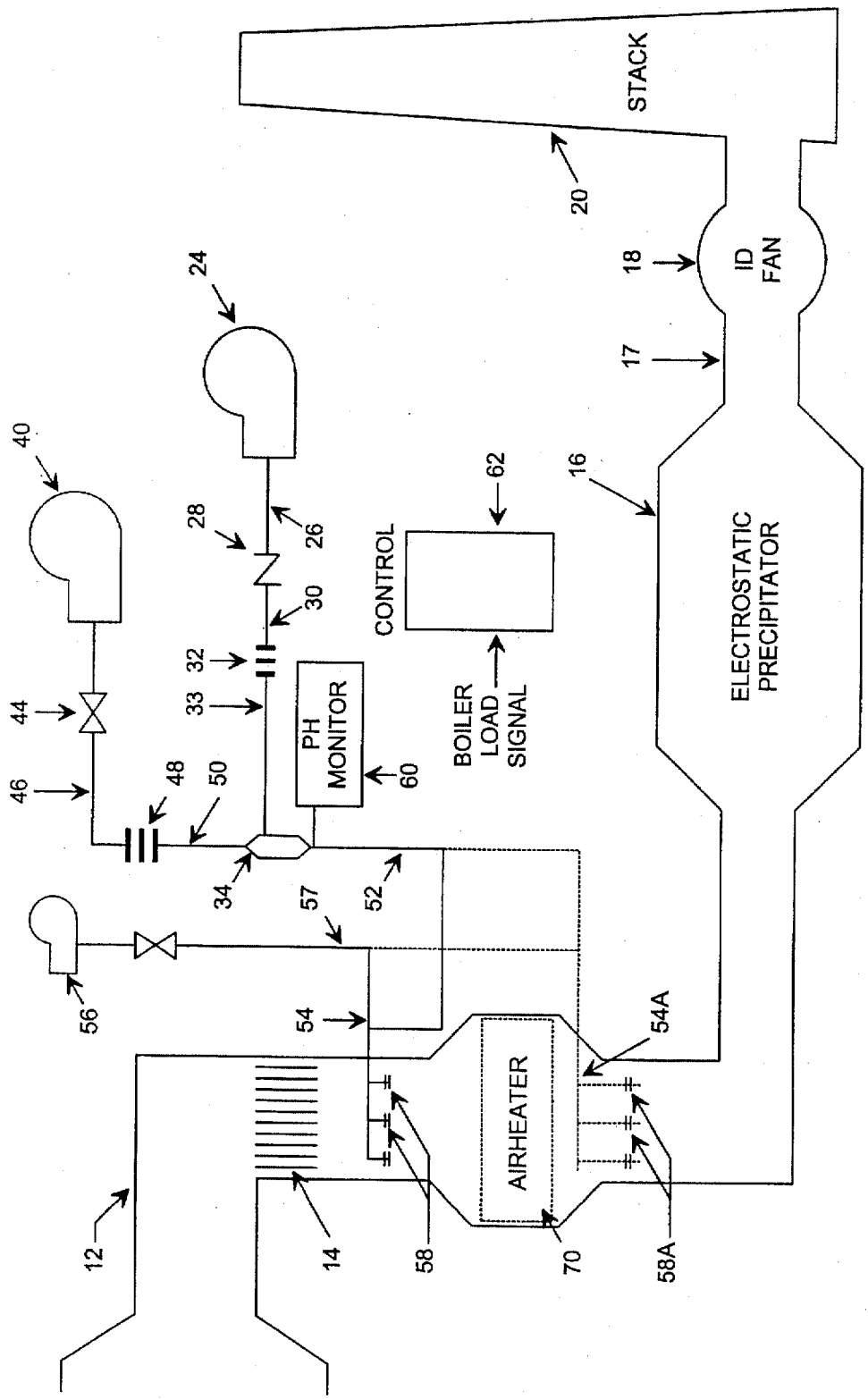
FIG. 1 is a diagrammatic drawing of a boiler system including a flue gas conditioning system in accordance with this invention.

With reference to FIG. 1, a preferred embodiment of the present invention is illustrated. A conventional boiler system in which the present invention may be used comprises a flue gas conduit 12 connected between the fuel combustion chamber of a boiler 10 and a conventional electrostatic precipitator 16 used to remove particulate from the flue gas. Typically, an economizer 14 having an inlet and an outlet is positioned within flue gas conduit 12 so as to require the flue gas to flow through said economizer 14. Flue gas exits the economizer 14 at approximately 750 to 800 degrees fahrenheit. An outlet of electrostatic precipitator 16 is coupled by a duct 17 to an inlet of an ID fan 18 which has an outlet coupled to a stack 20.

A source of liquid sulfuric acid 24 is provided. The source 24 may be a conventional carbon steel holding tank in which the sulfuric acid may be safely stored. Source 24 is connected by appropriate piping 26 to the inlet of sulfuric acid metering pump 28. The outlet of metering pump 28 is connected by piping 30 to the inlet of sulfuric acid flow meter 32. The outlet of sulfuric acid flow meter 32 is connected by piping 33 to a mixing means 34, typically a Teflon lined dilution header.

A pressurized source of water 40 is provided. Water source 40 is connected by appropriate piping 42 to the inlet of metering valve 44. The outlet of metering valve 44 is in turn connected by piping 46 to the inlet of flow meter 48.

The outlet of flow meter 48 is connected by piping 50 to mixing means 34.

A pH monitor 60 is provided and is positioned at the outlet of the mixing means 34. The flow of water to mixing means 34 is controlled so that the concentration of dilute sulfuric acid exiting mixing means 34 is maintained at approximately 15% maximum.

An injection nozzle header 54 is provided and is disposed in flue gas conduit 12 at or downstream of the outlet of economizer 14. Dilute sulfuric acid exiting mixing means 34 is conveyed to injection nozzle header 54 via piping 52. A pressure source 56 is provided and is also connected to injector nozzle header 54 via piping 57. Pressure source 56 may comprise a source of compressed air capable of supplying compressed air at approximately 100 SCFM and 100 psi to the injection nozzle header 54. A plurality of injection probes each having an air injection nozzle therewithin 58 are provided and are connected to the injection nozzle header 54.

The dilute sulfuric acid is thus conveyed, together with atomizing air, to the injection nozzles contained within probes 58, from which injection nozzles the dilute sulfuric acid is sprayed into the flue gas stream at the outlet of economizer 14. At economizer outlet temperatures (greater than 700° fahrenheit) the water will flash to steam and the sulfuric acid will disassociate to $SO_3$ and $H_2O$ (steam). The liberated $SO_3$ reduces the resistivity of the fly ash for removal by the precipitator 16.

Alternatively, pressure source 56 is a source of pressurized steam. The source of pressurized steam can also be connected to injection nozzle header 54 via piping 57 so that the steam can be used to atomize the sulfuric acid.

In a further alternative embodiment, where an airheater 70, having an inlet and an outlet, is provided and is disposed within flue gas conduit 12 downstream of the outlet of economizer 14, the injection nozzle header 54A and injection probes 58A (shown in dotted lines) are disposed at the outlet of airheater 70.

Control means 62 are provided. Typically, as in the preferred embodiment, a boiler load signal from a conventional boiler control device (not shown) will be connected to control means 62. When the boiler load signal rises above a predetermined set point, the control means causes valve 44 to open and water will begin to flow from water source 40 through mixer 34 to injection probes 58. When water flow is established at a predetermined rate; control 62 causes sulfuric acid metering pump 28 to start and meter sulfuric acid via piping means 30, flow meter 32 and piping means 33 to mixing means 34.

When the boiler load signal falls below a predetermined set point, control 62 causes pump 28 to stop so acid flow will cease, but the water flow will continue for a predetermined time thereby flushing the system. At that time, water flow will cease and the system will go into idle standby, until boiler load again climbs to the previously established set point level initiating water flow.

Alternatively and/or additionally, water and acid flow may be controlled by other signals provided to control means 62 which signals are determined by and proportional to precipitator power level and/or flue gas opacity. Appropriate known detecting and measuring devices (not shown) can be used to provide precipitator power signals and/or flue gas opacity signals to the control means 62.

The present invention allows for the conditioning of flue gases by a system which is simple and inexpensive to install, maintain and operate, which requires no additional heat to vaporize the dilute sulfuric acid prior to injection, and which requires very little power, especially when compared to a conventional $SO_3$ system. Additionally, the system is ready to operate when needed and does not require any special warm up or purge.

These and other benefits and advantages may be achieved by the present invention as described herein and defined in the appended claims.

Further, it should be apparent that various equivalent alterations, changes and modifications to the preferred embodiment may be made without departing from the spirit and scope of the present invention as claimed in the appended claims.

What is claimed is:

1. In a boiler system having a flue gas conduit for conveying heated flue gas from a fuel combustion chamber of a boiler to an electrostatic particulate removing device, an improved system for treating boiler flue gas to improve the removal of particulate matter from the flue gas comprising:
   a. a source of liquid sulfuric acid;
   b. a source of water;
   c. mixing means for mixing the sulfuric acid and the water to form a dilute sulfuric acid;
   d. a first pipe means for conveying said sulfuric acid from said acid source to said mixing means;
   e. a first metering means for controlling the amount of liquid sulfuric acid conveyed to said mixing means through said first pipe means;
   f. a second pipe means for conveying said water from said water source to said mixing means;
   g. a second metering means for controlling the amount of water conveyed to said mixing means through said second pipe means;
   h. injection means for injecting the mixture of sulfuric acid and water from said mixing means into the flue gas conduit before the particulate removing device in droplets small enough that the heat of the heated flue gas will cause said droplets to evaporate where said particulate matter is conditioned by said sulfuric acid to aid in electrostatic precipitation;
   i. a third pipe means for conveying said mixture of sulfuric acid and water from said mixing means to said injection means.

2. An improved system for treating boiler flue gas to improve the removal of particulate matter in a boiler system, as claimed in claim 1, further comprising a source of compressed air and a fourth pipe means for conveying said compressed air from said source of compressed air to said injection means so that said compressed air is mixed with said mixture of sulfuric acid and water and causes said mixture to be atomized as it is injected by said injection means into the flue gas stream.

3. An improved system for treating boiler flue gas to improve the removal of particulate matter in a boiler system, as claimed in claim 1, further comprising a source of steam and a fourth pipe means for conveying said steam from said source of steam to said injection means so that said steam is mixed with said mixture of sulfuric acid and water and causes said mixture to be atomized as it is injected by said injection means into the flue gas stream.

4. An improved system for treating boiler flue gas to improve the removal of particulate matter in a boiler system, as claimed in claims 1, 2 or 3, wherein said injection means further comprises a plurality of injection nozzles.

5. An improved system for treating boiler flue gas to improve the removal of particulate matter in a boiler system, as claimed in claim 2, further comprising air compressor means connected to said source of compressed air for increasing the pressure of the air supplied to said injection means to facilitate the atomization of said mixture of sulfuric acid and water.

6. An improved system for treating boiler flue gas to improve the removal of particulate matter in a boiler system, as claimed in claims 1, 2 or 3, wherein said first metering means comprises a metering pump.

7. An improved system for treating boiler flue gas to improve the removal of particulate matter in a boiler system, as claimed in claims 1, 2 or 3, wherein said first metering means comprises a flow meter.

8. An improved system for treating boiler flue gas to improve the removal of particulate matter in a boiler system, as claimed in claims 1, 2 or 3, wherein said first metering means comprises both a flow meter and a metering pump.

9. An improved system for treating boiler flue gas to improve the removal of particulate matter in a boiler system, as claimed in claims 1, 2 or 3, wherein said second metering means comprises a flow meter.

10. An improved system for treating boiler flue gas to improve the removal of particulate matter in a boiler system, as claimed in claims 1, 2 or 3, further comprising a pump means connected to said water source for increasing the pressure of the water supplied to said mixing means.

11. An improved system for treating boiler flue gas to improve the removal of particulate matter in a boiler system, as claimed in claims 1, 2 or 3, further comprising monitoring means for determining the pH of the mixture of sulfuric acid and water exiting said mixing means.

12. An improved system for treating boiler flue gas to improve the removal of particulate matter in a boiler system, as claimed in claims 1, 2 or 3, wherein said injection means is positioned at the outlet of an economizer which is positioned in the flue gas conduit.

13. An improved system for treating boiler flue gas to improve the removal of particulate matter in a boiler system, as claimed in claims 1, 2 or 3, wherein said injection means is positioned at the outlet of an air heater which is positioned in the flue gas conduit.

14. An improved system for treating boiler flue gas to improve the removal of particulate matter in a boiler system, as claimed in claims 1, 2 or 3, further comprising control means for controlling the initiation and termination of the flow of acid from said acid source and water from said water source responsive to one or more electrical signals representative of boiler system operating conditions.

15. An improved system for treating boiler flue gas to improve the removal of particulate matter in a boiler system, as claimed in claims 1, 2 or 3, further comprising control means for controlling the amount of water and the amount of sulfuric acid conveyed to said mixing means in response to at least one of the following: a boiler load signal, a precipitator power signal, or a flue gas opacity signal.

* * * * *